(12) United States Patent
Müller et al.

(10) Patent No.: US 9,539,920 B2
(45) Date of Patent: Jan. 10, 2017

(54) SEAT INCLINATION ADJUSTMENT MECHANISM, VEHICLE SEAT, AND METHOD FOR MOUNTING SAID VEHICLE SEAT

(71) Applicant: Johnson Controls Components GMBH & CO. KG, Kaiserslautern (DE)

(72) Inventors: Sascha Müller, Kaiserslautern (DE); Andreas Kinzer, Homburg (DE); Eckhard Kirch, Bann (DE); Joachim Mühlberger, Obersülzen (DE)

(73) Assignee: JOHNSON CONTROLS COMPONENTS GMBH & CO. KG, Kaiserslautern (DE)

( * ) Notice: Subject to any disclaimer, the term of this patent is extended or adjusted under 35 U.S.C. 154(b) by 0 days.

(21) Appl. No.: 14/396,423

(22) PCT Filed: Apr. 16, 2013

(86) PCT No.: PCT/EP2013/057863
§ 371 (c)(1),
(2) Date: Nov. 14, 2014

(87) PCT Pub. No.: WO2013/160147
PCT Pub. Date: Oct. 31, 2013

(65) Prior Publication Data
US 2015/0108813 A1    Apr. 23, 2015

(30) Foreign Application Priority Data

Apr. 25, 2012  (DE) .................. 10 2012 008 100
Jul. 20, 2012  (DE) .................. 10 2012 014 381

(51) Int. Cl.
*B60N 2/22*      (2006.01)
*B60N 2/225*     (2006.01)
(Continued)

(52) U.S. Cl.
CPC .............. *B60N 2/22* (2013.01); *B60N 2/0232* (2013.01); *B60N 2/2209* (2013.01);
(Continued)

(58) Field of Classification Search
CPC ....... B60N 2/22; B60N 2/2209; B60N 2/2222; B60N 2/2245; B60N 2/2252; B60N 2/235; B60N 2/0232; B62D 65/14; Y10T 29/49963
See application file for complete search history.

(56) References Cited

U.S. PATENT DOCUMENTS 2,725,921 A * 12/1955 Markin ................ B60N 2/0825
                                                  297/216.15
2,859,797 A * 11/1958 Mitchelson ............ B60N 2/231
                                                  296/65.18
(Continued)

FOREIGN PATENT DOCUMENTS

DE        2715547 A1    10/1978
DE        4031568 C1    4/1992
(Continued)

OTHER PUBLICATIONS

International Search Report for Application No. PCT/EP2013/057863, dated Jul. 6, 2013.
(Continued)

*Primary Examiner* — Philip Gabler
(74) *Attorney, Agent, or Firm* — The Dobrusin Law Firm, P.C.

(57) ABSTRACT

An adjustment unit for a vehicle seat is disclosed. Said adjustment unit comprises an inclination adjustment mechanism for the backrest of the vehicle seat. The inclination adjustment mechanism comprises a first rocker which is
(Continued)

mounted in such a way as to be rotatable about a transverse direction extending perpendicular to a direction of travel of the vehicle.

7 Claims, 5 Drawing Sheets

(51) Int. Cl.
*B60N 2/235* (2006.01)
*B60N 2/02* (2006.01)
*B62D 65/14* (2006.01)

(52) U.S. Cl.
CPC ......... *B60N 2/2222* (2013.01); *B60N 2/2245* (2013.01); *B60N 2/2252* (2013.01); *B60N 2/235* (2013.01); *B62D 65/14* (2013.01); *Y10T 29/49963* (2015.01)

(56) References Cited

U.S. PATENT DOCUMENTS

| | | | |
|---|---|---|---|
| 2,962,084 A | 11/1960 | Pickles | |
| 4,195,881 A * | 4/1980 | Kluting | B60N 2/2213 188/69 |
| 4,518,201 A * | 5/1985 | Wahlmann | B60N 2/2209 296/65.09 |
| 5,112,109 A * | 5/1992 | Takada | B60N 2/2222 297/320 |
| 7,229,118 B2 * | 6/2007 | Saberan | B60N 2/0224 296/65.01 |
| 7,510,228 B2 * | 3/2009 | Ito | B60N 2/0232 296/65.17 |
| 7,637,571 B2 * | 12/2009 | Okano | B60N 2/1821 297/14 |

FOREIGN PATENT DOCUMENTS

| | | |
|---|---|---|
| DE | 19641652 C1 | 3/1998 |
| DE | 19943573 A1 | 3/2001 |
| DE | 10044063 A1 | 3/2002 |
| DE | 2020004020657 U1 | 11/2005 |
| DE | 102005022645 B3 | 9/2006 |
| DE | 102005023936 A1 | 11/2006 |
| DE | 102007000292 A1 | 12/2007 |
| DE | 102008041128 A1 | 2/2010 |
| FR | 2761833 A1 | 10/1998 |
| JP | H01114840 U | 8/1989 |

OTHER PUBLICATIONS

Search Report for application No. PCT/EP2013/057862 dated Nov. 6, 2013.
International Preliminary Reprot on Patentability for Application No. PCT/EP2013/057863, dated Oct. 28, 2014.
Korean Office Action for Application No. KR1020147032955, dated Apr. 19, 2016.
Second Office Action for related Chinese application No. 201380021748.3 dated May 23, 2016.

* cited by examiner

SEAT INCLINATION ADJUSTMENT MECHANISM, VEHICLE SEAT, AND METHOD FOR MOUNTING SAID VEHICLE SEAT

PRIOR ART

The present invention relates to a seat inclination adjustment mechanism for vehicle seats.

It is generally known from the prior art to design the backrest of a vehicle seat to be adjustable with respect to its orientation in order to provide the greatest possible comfort for the vehicle occupant. Customarily, such seat inclination adjustment mechanisms comprise adjustment fittings which are arranged between a backrest and a seat part of the vehicle seat and permit an adjustment of the backrest relative to the seat part.

One drawback, however, is that because of the lack of available construction space in certain installation situations, it is not possible to arrange such adjustment fittings between the seat part and the backrest.

DISCLOSURE OF THE INVENTION

It is the object of the present invention to provide a seat inclination adjustment mechanism which does not require any adjustment fittings arranged between the seat part and the backrest.

This object is achieved by a seat inclination adjustment mechanism for a vehicle seat, wherein the seat inclination adjustment mechanism comprises a first rocker which is mounted rotatably about a transverse direction which is perpendicular to the direction of travel of the vehicle. A first end of the first rocker acts preferably in the manner of a rotary hinge on the backrest of the vehicle seat while a second end of the first rocker is fastened preferably to a body-mounted retaining clamp. The inclination of the backrest of the vehicle seat is adjusted by a change in angle of the orientation of the first rocker. The first rocker is connected at its first end to the backrest in the manner of a rotary hinge preferably via an adjustment fitting, wherein the adjustment fitting preferably comprises a wobble mechanism or a latching pawl adjuster. The adjustment fitting is driven in particular by a motor-driven drive. The second end of the first rocker is in particular connected in the manner of a rotary hinge in a slotted guide of the retaining clamp and in particular is mounted in a longitudinally displaceable manner along a guide slot of the slotted guide. The guide slot comprises in particular an elongated hole which is open on one side in order to permit rapid mounting of the vehicle seat.

A further subject matter of the present invention is a vehicle seat having a seat longitudinal adjustment mechanism according to the invention.

A further subject matter of the present invention is a method for mounting a vehicle seat, wherein, in a first step, first of all the vehicle seat is provided in a configuration with a backrest shifted forward, and, in a subsequent, second step, is arranged or fastened, at least temporarily, on a substructure. In a subsequent, third step, the backrest is pivoted back within the scope of a pivoting movement, and therefore a bolt located at the second end of the first rocker enters into engagement with the slotted guide which is open on one side.

According to a preferred embodiment of the present invention, the backrest of the vehicle seat comprises a backrest main part and a backrest upper part, wherein the backrest main part and the backrest upper part are connected to each other in the manner of a rotary joint via a common pivot axis. The backrest main part and the backrest upper part are coupled to each other in the region of the second pivot axis, in particular by means of a further adjustment unit, in such a manner that an adjustment of the further adjustment unit brings about a change in the angle between the backrest main part and the backrest upper part about the second pivot axis. The further adjustment unit comprises in particular a motor-driven wobble mechanism or a latching pawl adjuster. The further adjustment unit is therefore in particular part of an adjustment of the curvature of the backrest.

According a preferred embodiment of the present invention, it is provided that a headrest is arranged at an upper end of the backrest upper part, wherein two retaining rods of the headrest are fastened in guide bushes of the backrest. The headrest is mounted in particular in a vertically adjustable manner in the guide bushes.

Further details, features and advantages of the invention emerge from the drawings and from the description below of preferred embodiments with reference to the drawings. The drawings here illustrate merely exemplary embodiments of the invention which do not restrict the essential concept of the invention.

DESCRIPTION OF THE FIGURES

In the various figures, identical parts are always provided with the same reference numbers and are therefore generally also only referred to or mentioned once in each case.

Figure 1A:
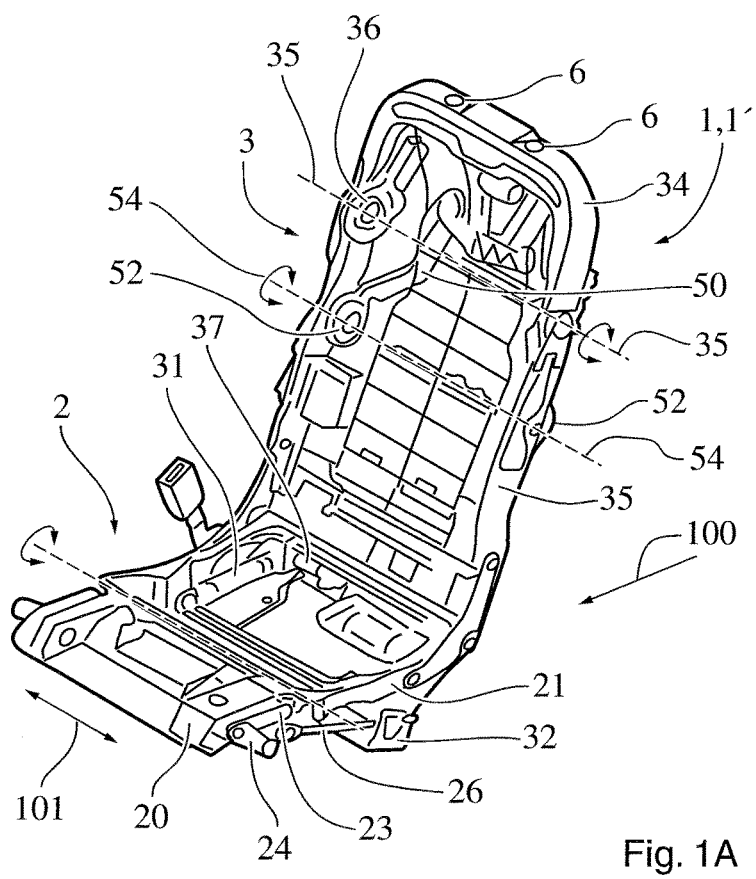
FIGS. 1A and 1B illustrates a schematic perspective view of a vehicle seat for a motor vehicle.
Figure 1B:
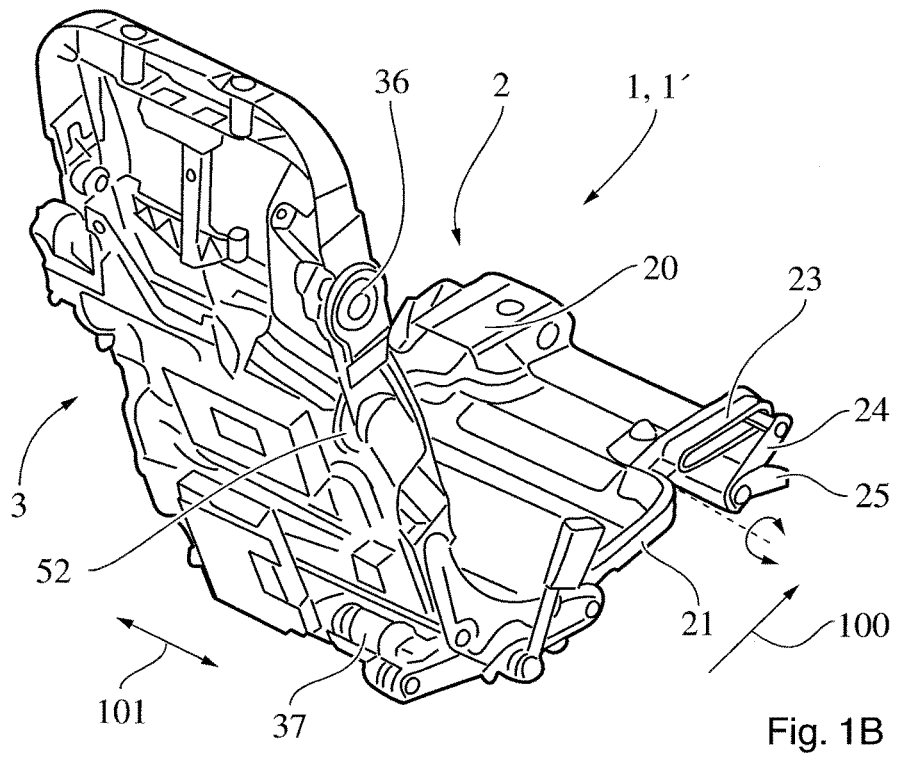

FIGS. 1A and 1B illustrate schematic perspective views of a vehicle seat 1 for a motor vehicle. In particular, a vehicle seat 1 for the vehicle rear of the motor vehicle is involved here. The vehicle seat 1 comprises a seat part 2, and a backrest 3.

The vehicle seat 1 furthermore has a backrest inclination adjustment mechanism. The backrest inclination adjustment mechanism comprises a first rocker 50, the first end of which is connected in the manner of a rotary hinge to the backrest 3 and the second end of which is connected in the manner of a rotary hinge to a vehicle-mounted retaining clamp 51. The first end of the first rocker 50 is connected to the backrest 3 about an axis of rotation 54 in the manner of a rotary hinge via an adjustment unit 52, in particular a wobble mechanism or a latching pawl adjuster. The adjustment unit 52 here permits a change in angle between the backrest 3 and the first rocker 50, as a result of which the inclination of the backrest 3 changes. The second end of the first rocker 50 is preferably fastened in a slotted guide 53 of the retaining clamp 51. The adjustment unit 52 preferably has a drive, and therefore a motor-assisted adjustment of the backrest inclination is made possible.

The backrest 3 of the vehicle seat 1 preferably comprises a backrest main part 33 and a backrest upper part 34, wherein the backrest main part 33 and the backrest upper part 34 are connected to each other in the manner of a rotary hinge via a common second pivot axis 35. The second pivot axis 35 runs parallel to the transverse direction 101. The backrest main part 33 and the backrest upper part 34 are coupled to each other in the region of the second pivot axis 35, in particular by means of a further adjustment unit 36, in such a manner that an adjustment of the further adjustment unit 36 brings about a change in the angle between the backrest main part 33 and the backrest upper part 34 about the second pivot axis 35. The further adjustment unit 36 comprises in particular a motor-driven wobble mechanism or a motor-driven latching pawl adjuster. The further adjustment unit 36 is in particular part of an adjustment of the curvature of the backrest. A headrest 4 is connected to the upper end of the vehicle seat 1 and in particular of the backrest upper part 34. Preferably, for this purpose, two retaining rods 5 of the headrest 4 are fastened in guide bushings 6 of the backrest 3. The headrest 4 is provided in particular in a height-adjustable manner in the guide bushings 6, and therefore the guide bushings 6 are in particular part of a headrest height adjuster.

The seat part 2 defines a seat surface for a vehicle occupant and comprises a front part 20, and a main part 21. The main part 21 is mounted in the manner of a rotary hinge on a first rocker 31. The lower side of the front part 20 has a slotted guide 23 in which a first end of a third rocker 24 is mounted in the manner of a rotary hinge about a transverse axis which extends along a transverse direction 101 which is perpendicular to the direction of travel 100, wherein the first end is mounted in the slotted guide 23 in a longitudinally displaceable manner in the direction of travel 100. The second end of the third rocker 24 is connected in the manner of a rotary hinge to a holder 25 fastened to the vehicle floor. Furthermore, a first end of a spindle 26 is connected rotatably to the third rocker 24.

The main part 21 of the vehicle seat 1 is fastened via a fourth rocker 31 to a body-mounted substructure 40 of the vehicle seat 1. A first end of the fourth rocker 31 is connected rotatably to the main part 21 while the second end of the fourth rocker 31 is fastened rotatably to the substructure 40. The fourth rocker 31 preferably comprises a longitudinal adjustment unit for adjusting the length of the fourth rocker 31, for example via a cylinder-piston guide or a spindle drive. The fourth rocker 31 is therefore part of a seat longitudinal adjustment mechanism for the vehicle seat 1, since a change in length of the fourth rocker 31 brings about a movement of seat part 2 in the direction of travel 100. Furthermore, the angle of the fourth rocker 31 in relation to the substructure 40 is preferably changeable via a drive 37, and therefore the height of the seat part 2 can be changed via a change in angle of the fourth rocker 31. The fourth rocker 31 therefore preferably also forms part of a height adjustment mechanism for the vehicle seat 1.

The position of the third rocker 24 relative to the substructure 40 can be changed via a further drive 32. The inclination of the front part 20 can be changed in this manner. Furthermore, the inclination of the seat surface of the seat part 2 is thereby changed. The drive 32 and the spindle 26 are therefore part of a seat surface inclination adjustment mechanism for the vehicle seat 1.

Figure 2A:
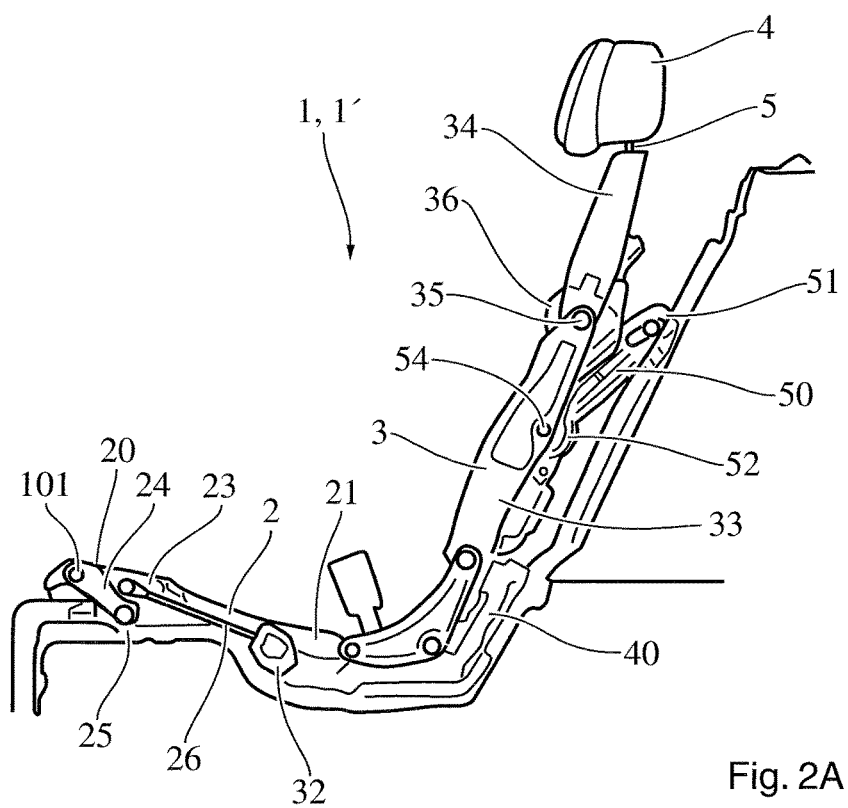
FIGS. 2A to 2E illustrates side views of the vehicle seat according to the invention, in which the vehicle seat is arranged in different postions.
Figure 2B:
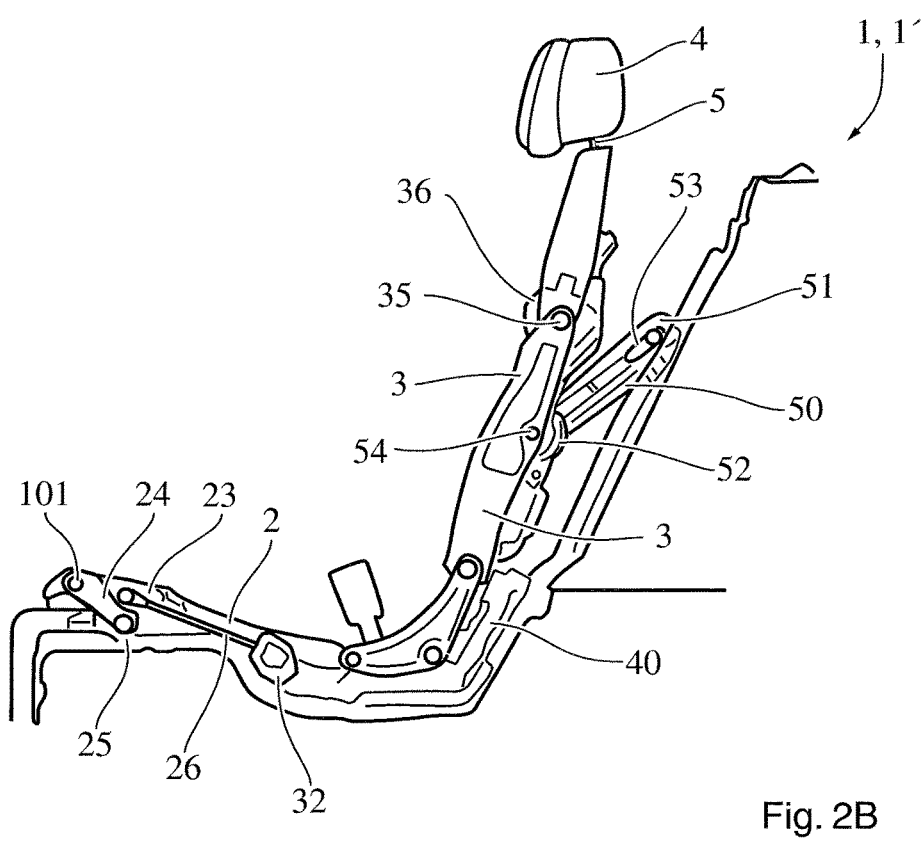
Figure 2C:
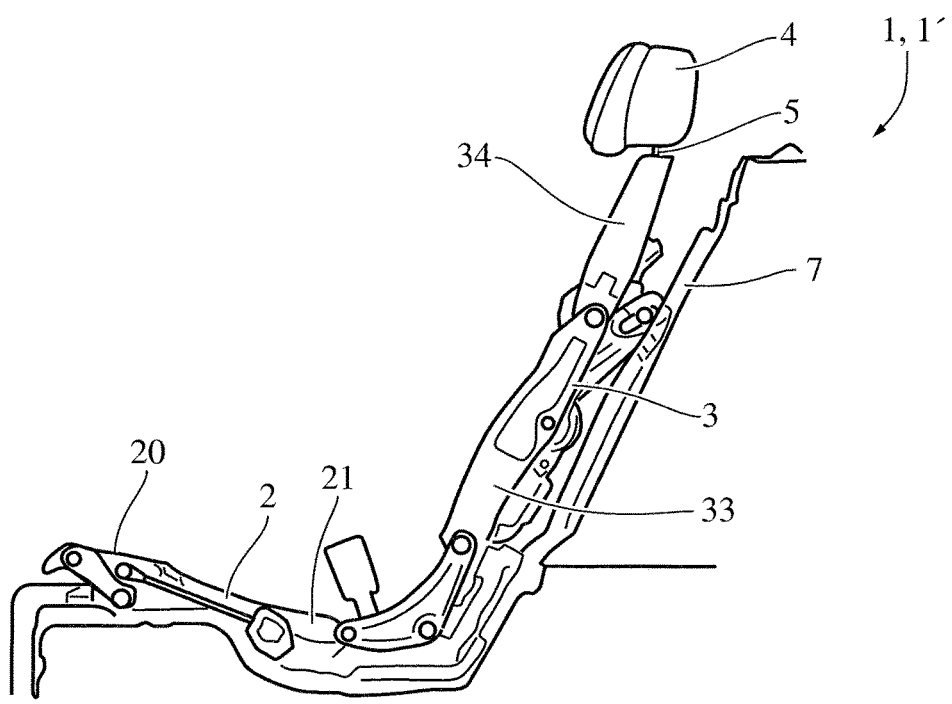
Figure 2D:
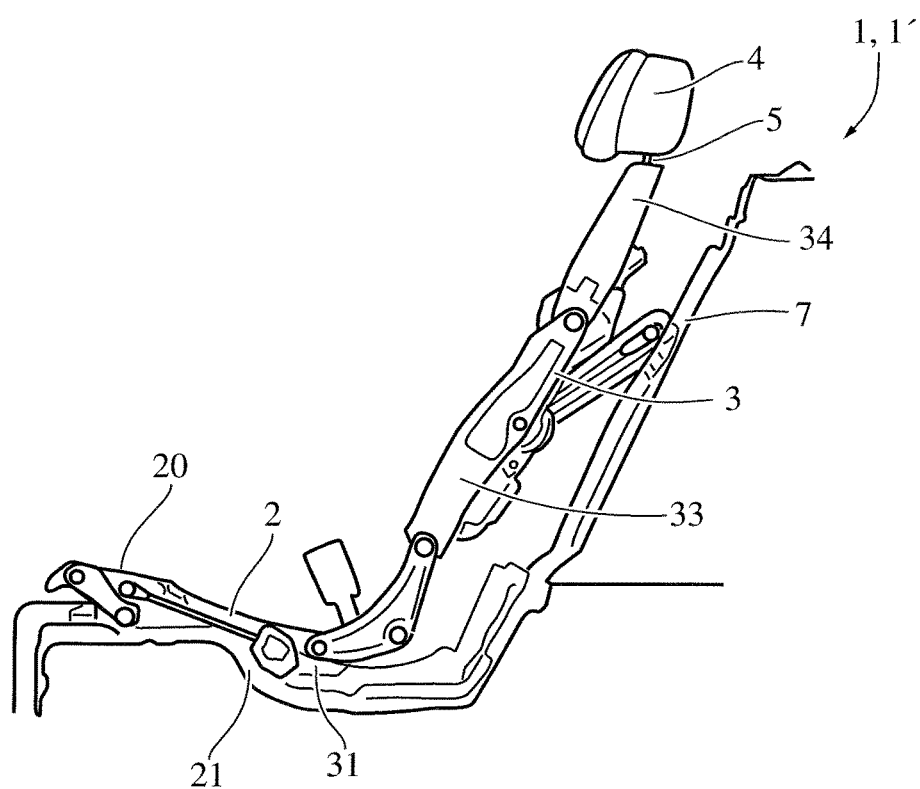
Figure 2E:
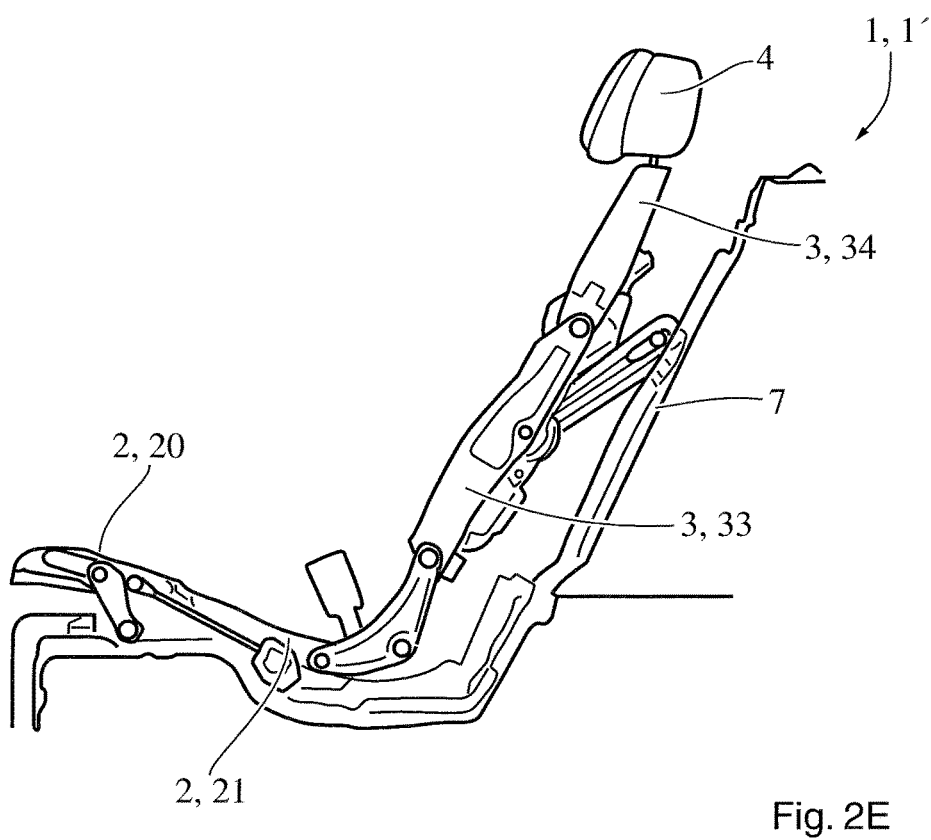

FIGS. 2A to 2E illustrate side views of the vehicle seat 1 according to the invention, in which the vehicle seat 1 is arranged in different positions. FIG. 2A illustrates a starting position of the vehicle seat 1. In FIG. 2B, the backrest 3 is shifted by means of the backrest inclination adjustment mechanism into a position pivoted forward in relation to the starting position. In FIG. 2C, the backrest 3 is shifted by means of the backrest inclination adjustment mechanism into a position pivoted back in relation to the position. In FIG. 2D, the seat part 2 is shifted by means of the seat longitudinal adjustment mechanism into a position shifted forward in relation to the starting position, as a result of which at the same time the angle of inclination of the backrest main part 33 has changed in relation to the starting position. The backrest main part 33 is in a flatter orientation. The backrest upper part 34 remains in the starting position, and therefore, by the shifting forward of the seat part 2, the curvature of the backrest or the profile of the backrest 3 has also changed. In FIG. 2E, the backrest upper part 34 is in a position pivoted back in relation to the starting position by means of the adjustment of the curvature of the backrest, and therefore the curvature of the backrest or profile of the backrest 3 known from the starting position is restored. Furthermore, by means of the change in the angular position of the backrest upper part 34, the orientation of the headrest 4 has also correspondingly changed.

Figure 3:
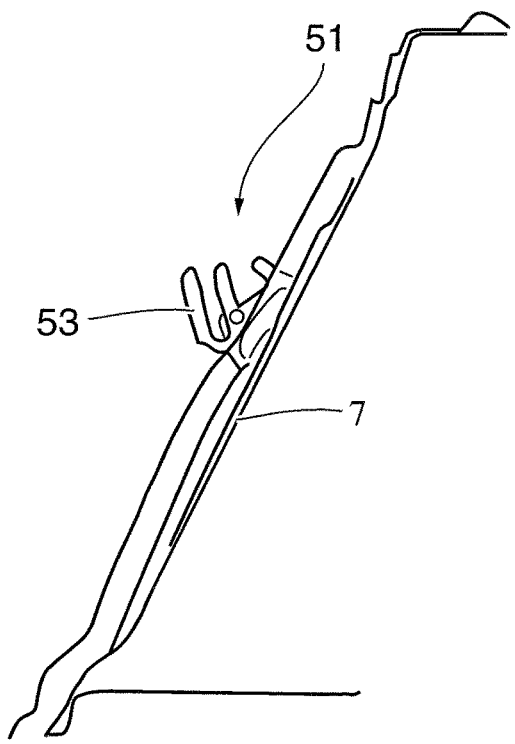
FIG. 3 illustrates a schematic detailed view of the retaining clamp fastened to a vehicle base.

FIG. 3 illustrates a schematic detailed view of the retaining clamp 51 fastened to a vehicle base 7. The slotted guide 53 which is open on one side and in which the second end of the fourth rocker 50 runs can clearly be seen in this view.

Figure 4:
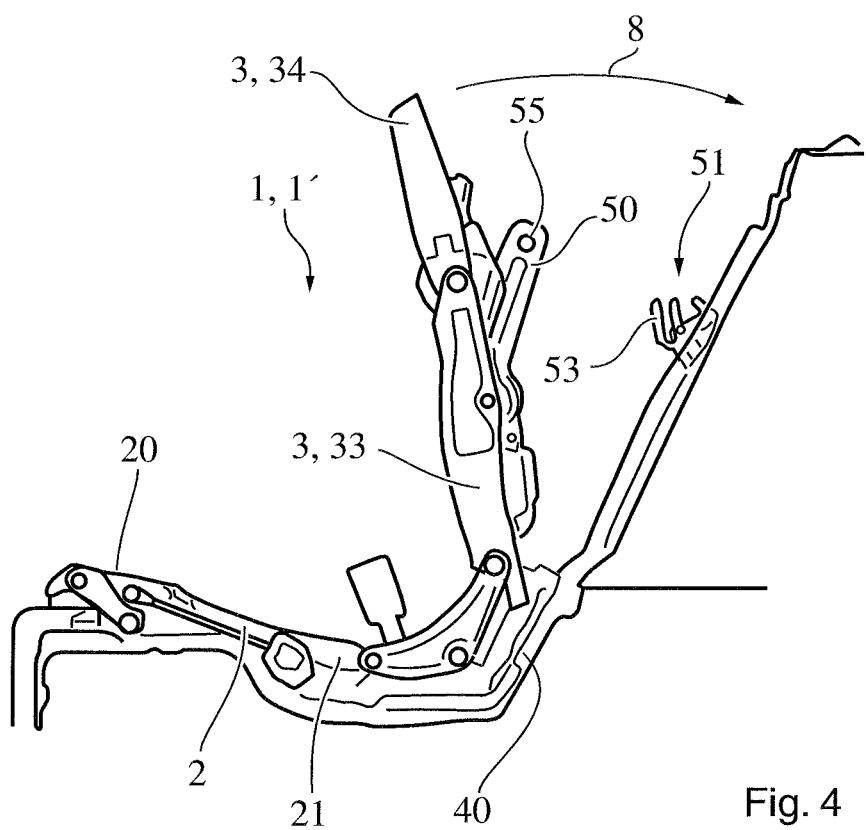
FIG. 4 illustrates the method for mounting the vehicle seat in the vehicle.

FIG. 4 illustrates the method for mounting the vehicle seat 1 in the vehicle, wherein, in a first step, first of all the vehicle seat 1 is provided in a configuration with a backrest 3 shifted forward, and, in a subsequent, second step, is fastened on the substructure 40. In a subsequent, third step, the backrest 3 is pivoted back within the scope of a pivoting movement 8, and therefore a bolt 55 which is located at the second end of the first rocker 50 enters into engagement with the slotted guide 53 which is open on one side. The vehicle seat 1 is subsequently fixed.

LIST OF REFERENCE NUMBERS 1 vehicle seat
2 seat part
3 backrest
4 headrest
5 retaining rod
6 guide bushing
7 vehicle base
8 pivoting movement
20 front part
21 main part
23 slotted guide
24 third rocker
25 holder
26 spindle
31 fourth rocker
32 drive
33 backrest main part
34 backrest upper part
35 second pivot axis
36 further adjustment unit
40 substructure
50 first rocker
51 retaining clamp
52 adjustment unit
53 further slotted guide
54 axis of rotation
55 bolt
100 direction of travel
101 transverse direction

The invention claimed is:

1. An adjustment unit for a vehicle seat in a vehicle, wherein the adjustment unit comprises an inclination adjustment mechanism for a backrest of the vehicle seat, wherein the inclination adjustment mechanism comprises a first rocker which is connected to the backrest and which is mounted rotatably about a transverse direction which is perpendicular to a direction of travel of the vehicle and the adjustment unit further comprises a longitudinal and height adjustment mechanism for a seat part of the vehicle seat, the longitudinal and height adjustment mechanism including a second rocker which is connected to the seat part and which is mounted rotatably about the transverse direction, wherein the backrest comprises a backrest main part and a backrest upper part, wherein the backrest main part and the backrest upper part are connected to each other in a manner of a rotary joint via a pivot axis of the backrest main part and backrest upper part for an adjustment of the curvature of the backrest;

wherein the backrest main part and the backrest upper part are coupled to each other in a region of the pivot axis by means of an adjustment fitting in such a manner that an adjustment of the adjustment fitting brings about a change in angle between the backrest main part and the backrest upper part about the pivot axis; and wherein the adjustment fitting comprises a motor-driven wobble mechanism or a latching pawl adjuster;

wherein the seat part defines a seat surface for a vehicle occupant and comprises a front part, and a main part;

wherein the main part is mounted in the manner of a rotary hinge on the second rocker;

wherein a lower side of the front part has a slotted guide in which a first end of a third rocker is mounted in the manner of a rotary hinge about a further transverse axis which extends along the transverse direction which is perpendicular to the direction of travel;

wherein a second end of the third rocker is connected in the manner of a rotary hinge to a holder fastened to a vehicle floor;

wherein a position of the third rocker relative to a substructure can be changed via a further drive; and wherein the inclination of the front part can be changed in this manner.

2. The adjustment unit of claim 1, wherein a first end of the first rocker acts in the manner of a rotary hinge on the backrest of the vehicle seat while a second end of the first rocker is fastened to a body-mounted retaining clamp.

3. The adjustment unit of claim 2, wherein the first rocker is connected at its first end to the backrest in the manner of a rotary hinge, which rotates about another pivot axis via another adjustment fitting, wherein the another adjustment fitting comprises a wobble mechanism or a latching pawl adjuster, and a motor-driven drive.

4. The adjustment unit of claim 2, wherein the second end of the first rocker is connected in the manner of a rotary hinge in a slotted guide of the retaining clamp and is mounted in a longitudinally displaceable manner along a guide slot of the slotted guide, wherein the guide slot is an elongated hole which is open on one side.

5. The adjustment unit of claim 1, wherein the adjustment unit is designed such that the inclination of the backrest is adjusted by a change in angle of the orientation of the first rocker.

6. A vehicle seat having an adjustment unit as claimed in claim 1.

7. A method for mounting the vehicle seat as claimed in claim 6, wherein, in a first method step, the vehicle seat is provided in a configuration with the backrest shifted forward, wherein, in a second method step, the vehicle seat is arranged or fastened, at least temporarily, on the substructure, and wherein, in a third method step, the backrest is pivoted back by a pivoting movement in such a manner that a bolt located at the second end of the first rocker enters into engagement with a slotted guide which is open on one side.

* * * * *

UNITED STATES PATENT AND TRADEMARK OFFICE
CERTIFICATE OF CORRECTION

PATENT NO.        : 9,539,920 B2                                                          Page 1 of 1
APPLICATION NO.   : 14/396423
DATED             : January 10, 2017
INVENTOR(S)       : Müller et al.

It is certified that error appears in the above-identified patent and that said Letters Patent is hereby corrected as shown below:

In the Claims

Column 6, Line 37, delete "at the second" and insert --at a second--

Signed and Sealed this
Eleventh Day of April, 2017

Michelle K. Lee
*Director of the United States Patent and Trademark Office*